(12) United States Patent
Mummadi et al.

(10) Patent No.: US 12,147,489 B2
(45) Date of Patent: *Nov. 19, 2024

(54) DYNAMICALLY DETERMINING A SERVER FOR ENROLLMENT WITH MANAGEMENT SYSTEM

(71) Applicant: VMWare LLC, Palo Alto, CA (US)

(72) Inventors: Raghavendra Mummadi, Atlanta, GA (US); David Jablonski, Acworth, GA (US); Gerard T. Murphy, Atlanta, GA (US); Soorya Rajasoorya, Palo Alto, CA (US); Adarsh Subhashi Chandra Jain, Atlanta, GA (US); James Wells, Atlanta, GA (US)

(73) Assignee: Omnissa, LLC, Mountain View, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 17/498,235

(22) Filed: Oct. 11, 2021

(65) Prior Publication Data
US 2022/0027429 A1   Jan. 27, 2022

Related U.S. Application Data

(63) Continuation of application No. 16/255,517, filed on Jan. 23, 2019, now Pat. No. 11,151,214.

(51) Int. Cl.
*H04L 9/40* (2022.01)
*G06F 16/955* (2019.01)
*G06F 3/04817* (2022.01)

(52) U.S. Cl.
CPC ...... *G06F 16/9566* (2019.01); *H04L 63/0853* (2013.01); *G06F 3/04817* (2013.01)

(58) Field of Classification Search
None
See application file for complete search history.

(56) References Cited

U.S. PATENT DOCUMENTS 7,600,042 B2 * 10/2009 Lemson ............... G06Q 10/107
709/245
9,094,443 B1 * 7/2015 Martini ................ H04L 67/568
(Continued)

FOREIGN PATENT DOCUMENTS

KR   1020170127330   11/2017

OTHER PUBLICATIONS

International Search Report and Written Opinion, International Application No. PCT/US2020/014640, dated May 25, 2020.

*Primary Examiner* — Joseph P Hirl
*Assistant Examiner* — Hassan Saadoun
(74) *Attorney, Agent, or Firm* — Kim & Stewart LLP (57) ABSTRACT

Examples described herein include systems and methods for dynamically determining a server for enrollment with a management system. An example method can include receiving user input at an application executing on a user device, such as a portal application that provides access to and authentication for other applications through a catalogue of application icons. If the user input includes a first URL but that URL produces an error when used in conjunction with extensions associated with a management server, the application can automatically use extensions associated with an application-support server. The application can then retrieve a second URL from the application-support server and use it for performing enrollment steps at the management server. The enrollment steps can include authenticating the user at an identity service and determining the user's group ID for enrollment, for example.

20 Claims, 4 Drawing Sheets

(56) References Cited

U.S. PATENT DOCUMENTS

| | | |
|---|---|---|
| 10,339,423 B1 * | 7/2019 | Dinerstein ............ G06F 18/214 |
| 10,412,176 B2 * | 9/2019 | Ma ........................ G06F 40/197 |
| 2006/0206834 A1 | 9/2006 | Fisher |
| 2007/0268121 A1 | 11/2007 | Vasefi |
| 2009/0063481 A1 | 3/2009 | Faus |
| 2009/0313318 A1 * | 12/2009 | Dye ....................... G06Q 30/00 |
| | | 709/219 |
| 2012/0054875 A1 | 3/2012 | Antill |
| 2015/0020109 A1 | 1/2015 | Higa |
| 2015/0089617 A1 | 3/2015 | Sondhi |
| 2015/0186133 A1 | 7/2015 | Yarra |
| 2016/0196484 A1 * | 7/2016 | Ciavatta ........... G06K 19/06037 |
| | | 235/462.1 |
| 2016/0248757 A1 | 8/2016 | Williams |
| 2016/0366119 A1 * | 12/2016 | Rykowski ............... G06F 21/41 |
| 2017/0094509 A1 * | 3/2017 | Mistry .................... H04W 4/50 |
| 2018/0067811 A1 * | 3/2018 | Mowatt ................. G06F 11/142 |
| 2019/0230130 A1 | 7/2019 | Beckman |
| 2019/0347181 A1 | 11/2019 | Cranfill |

\* cited by examiner

DYNAMICALLY DETERMINING A SERVER FOR ENROLLMENT WITH MANAGEMENT SYSTEM

This application is a continuation of U.S. patent application Ser. No. 16/255,517, titled "DYNAMICALLY DETERMINING A SERVER FOR ENROLLMENT WITH MANAGEMENT SYSTEM" and filed Jan. 23, 2019, which is incorporated herein in its entirety for all purposes.

BACKGROUND

An enterprise can implement a mobile device management ("MDM") or enterprise mobility management ("EMM") system, allowing the enterprise to manage a wide variety of user devices such as phones and computers. A managed user device can be provided by the enterprise or can be a user's personal device. In order to begin management of a user device, the user device must be registered with the management system. The process of registering a user device is commonly referred to as enrollment.

Enrollment with a management system can be an inefficient process. In the past, some systems required a dedicated management application to be downloaded to the device in order to perform enrollment. Since that time, newer systems have incorporated certain enrollment features into other types of applications. But regardless of its form, enrollment generally requires the user to provide one or more pieces of information to the management system in order to begin the enrollment process. That information can then be used to determine the identity of the user, the group to which the user belongs, the correct server for performing enrollment, and other relevant information.

The more information that is required from a user, the less likely the user is to enroll their device in a timely manner. As a result, there is a need for systems that can take a small number of relevant information items, or perhaps even one such item, and use it to make additional determinations necessary for enrollment. Many challenges can exist with this approach, with one challenge being determining the correct server to use for enrollment where multiple server options exist. For example, an application that provides enrollment features may be supported by one server, but the enrollment process may require information stored at a second server that is unknown to the first server. In that case, if a user provided the first server's uniform resource locator ("URL"), the system would be unable to enroll the user's device. When multiple systems are combined into one, this type of confusion can multiply and derail enrollment efforts.

As a result, a need exists for systems and methods for dynamically determining a server for enrollment with a management system based on minimal information from the user.

SUMMARY

Examples described herein include systems and methods for dynamically determining a server for enrollment with a management system. An example method can include receiving user input at a portal application executing on a user device. The portal application can be an application that facilitates access to other applications. For example, it can provide a catalogue of application icons corresponding to different applications that are available to the user. The applications can be applications downloadable to the user device or web-based applications, for example. The portal application can selectively show application icons for those applications available to or authorized for the user. It can also provide authentication across those applications, using single-sign-on ("SSO") techniques for example.

The user input received as part of the example method can include a first URL. The user can input the URL into a user interface displayed by the portal application, for example. The portal application can modify the first URL by adding an extension associated with a management server that handles enrollment procedures. If the management server does not recognize the modified URL, an error message of some sort can be received at the portal application. Based on receiving that error message or otherwise detecting the associated error, the portal application can automatically modify first URL in a different manner that incorporates an extension associated with an application-support server. The application-support server can be a server that stores information relevant to the portal application, such as information regarding the applications to which the user is authorized to use, the user's credentials, and other relevant information.

The method can include receiving, from the application-support server, a second URL. Additional information can be provided from the application-support server at this time, including an identification of an organization to which the user belongs. The second URL can be received at the user device, which can then use the second URL to contact the management server and initiate enrollment. The management server can then provide instructions for enrollment or take additional steps as necessary.

For example, based on receiving the second URL, the management server can determine a group ID indicating an enrollment group for the user. The management server can also retrieve information regarding an identity service for authenticating the user, such as an identity provider's 140 URL. The management server can provide an instruction to the portal application to provide a redirect screen that redirects to an identity service. The user can use the redirect screen to enter authentication information and submit it to the identity service.

After authenticating the user, the identity service can provide an access token to the user device. The user device can then send the access token to the management server, and the management server can validate the access token by contacting the identity service directly. After validating the access token, the management server can issue an authentication token to the user device. The authentication token can authorize the portal application to provide access to one or more other applications through the catalogue interface of the portal application.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for dynamically determining a server for enrollment with a management system. An example method can include receiving user input at an application executing on a user device, such as a portal application that provides access to and authentication for other applications through a catalogue of application icons. If the user input includes a first URL but that URL produces an error when used in conjunction with extensions associated with a management server, the application can automatically use extensions associated with an application-support server. The application can then retrieve a second URL from the application-support server and use it for performing enrollment steps at the management server. The enrollment steps can include authenticating the user at an identity service and determining the user's group ID for enrollment, for example. The portal application can also handle different types of user input, such as an email address or a Quick Response ("QR") code.

Figure 1:
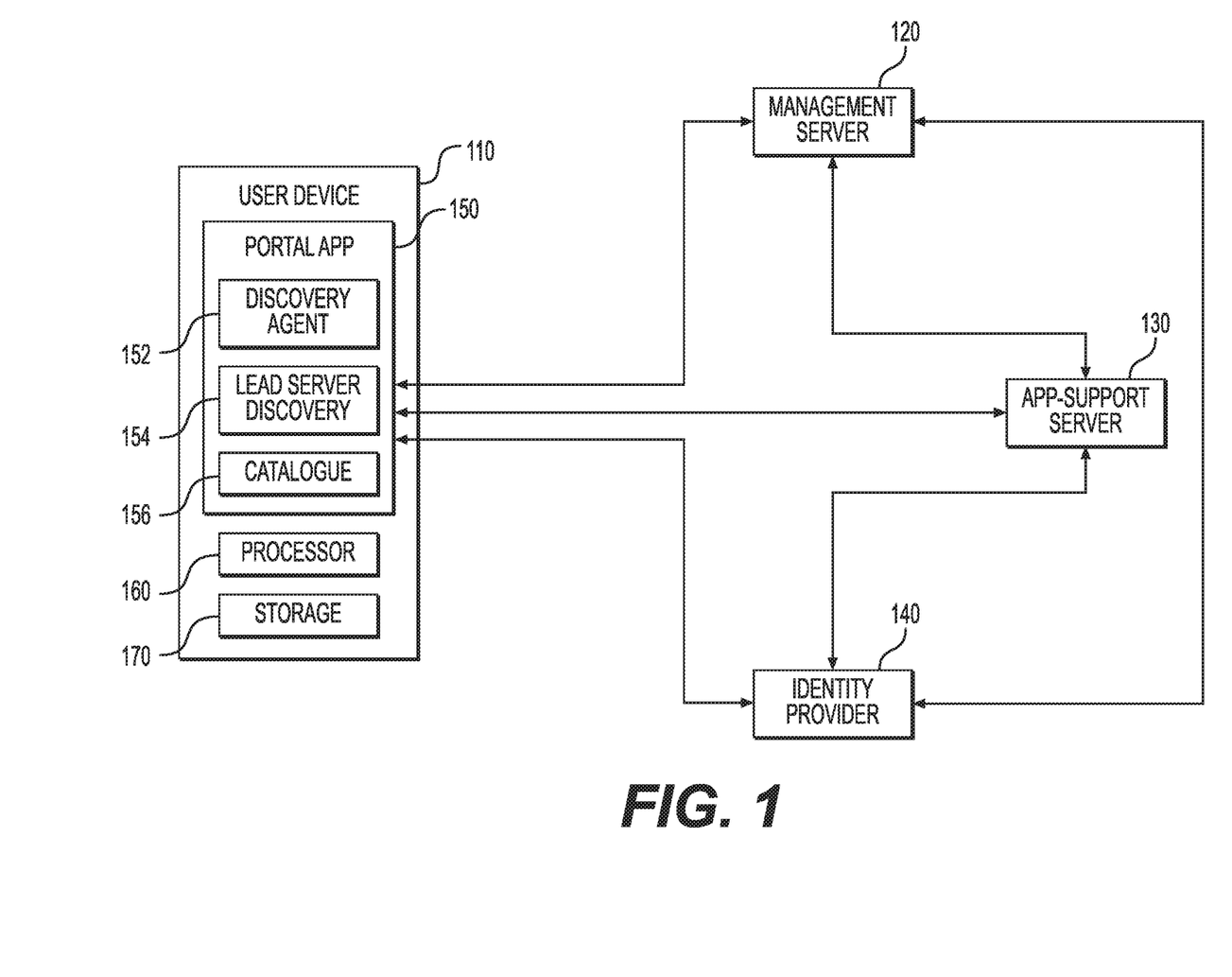
FIG. 1 is an illustration of a system for dynamically determining a server for enrolling a user device with a management system.

FIG. 1 provides an illustration of a system for dynamically determining a server for enrolling a user device with a management system. The system can include a user device 110, which can be any type of computing devices. Common examples of a user device 110 include laptop and desktop computers, phones, smartphones, and tablets. The user device 110 can include a processor 160, which can be a hardware processor such as a single- or multi-core central processing unit ("CPU"). The processor 160 can execute instructions stored in a non-transitory, computer-readable storage medium. For example, the instructions can be stored in a memory storage 170 location of the user device 110.

The user device 110 can include various applications such as applications provided by default with the operating system of the user device 110, applications downloaded from an application store, applications provisioned by a server or other component of a management system, and web-based applications. In this example, the user device 110 includes a portal application 150. The portal application 150 can be an application that facilitates access to other applications. The portal application 150 can provide a catalogue 156 of application icons corresponding to different applications that are available to the user. The applications can be applications downloadable to the user device 110 or web-based applications, for example. The portal application 150 can selectively show application icons in the catalogue 156 for those applications available to or authorized for the user. It can also provide authentication across those applications, for example by using SSO to provide authorization credentials to an application corresponding to a selected application icon. The portal application 150 can also include a discovery agent 152 and a lead server discovery module 154, discussed in more detail with respect to FIG. 3.

The system can also include a management server 120. The management server 120 can be a single server or a group of servers having at least one processor. The management server 120 can include a storage location accessible to the server, either locally or remotely. The management server 120 can provide various management functions for a user device 110. For example, the management server 120 can handle an enrollment procedure that enrolls a user device 110 into the overall management system. And enrollment procedure can be instigated by contacting the management server 120 at a specific URL that triggers enrollment. The management server 120 can also provision applications and profiles to the user device 110. The profiles can be used to remotely control certain functionality of the user device 110, such as access to enterprise resources.

The management server 120 can communicate with the user device 110 through software on the user device 110, such as a standalone agent application or a portal application 150 that incorporates the functionality of an agent application. The portal application 150 can use authorization credentials to communicate securely with the management server 120 and can periodically send updates to the management server 120 that include device information. The management server 120 can use this device information to make determinations or take responsive actions.

The management server 120 can include a console with a user interface. The console can be accessed through a browser application and displayed as a web page, for example. In other examples, the console can be a dedicated kiosk-type device. An administrator can configure settings through the console, such as by creating a profile for a user. The management server 120 can receive the configurations through the console and take necessary actions, such as generating the profile and causing it to be transmitted to the user device 110.

In some examples, the process of enrollment with the management server 120 requires a URL that triggers the enrollment process. The URL can be a web location or a command that is parsed by the management server 120. For example, the URL can include a command that corresponds to initiation of the enrollment process for the user device 110. In some examples, the URL can be triggered by another mechanism, such as by scanning a QR code. The portal application 150 can provide an interface for scanning the QR code, for example.

The system can also include an application-support server 130 that supports the portal application 150. The application-support server 130 can maintain a database of applications that are supported by the portal application 150. It can also maintain a list of applications to which the user is entitled to access from the user device 110. This list can be provided by the management server 120, an identity provider 140, or a combination thereof. The application-support server 130 can also communicate directly with the portal application 150. For example, the application-support server 130 can provide instructions regarding displaying certain pages or prompts within the graphical user interface ("GUI") of the portal application 150. If a new application becomes available to the user and that availability is reflected at the application-support server 130, then the application-support sever 130 can provide an instruction to the portal application 150 to begin displaying an icon associated with the newly available application in the catalogue 156 of the portal application 150.

The system can optionally include an identity provider 140. The identity provider 140 can be a server, or network of servers, that provides authentication services. An example identity provider 140 is VMware® Identity Manager® ("vIDM"). The identity provider 140 can store information about a user sufficient to identify and authenticate the user across various platforms. The identity provider 140 can generate tokens, for example, that reflect a successful authentication of a user. In some examples, the identity provider 140 can provide device-specific authentication such that the authentication corresponds to both a user and a particular user device 110. The identity provider 140 can be associated with or part of the management server 120 in some examples. In other examples, the identity provider 140 is omitted from the system and those responsibilities are handled by the management server 120 instead.

Figure 2:
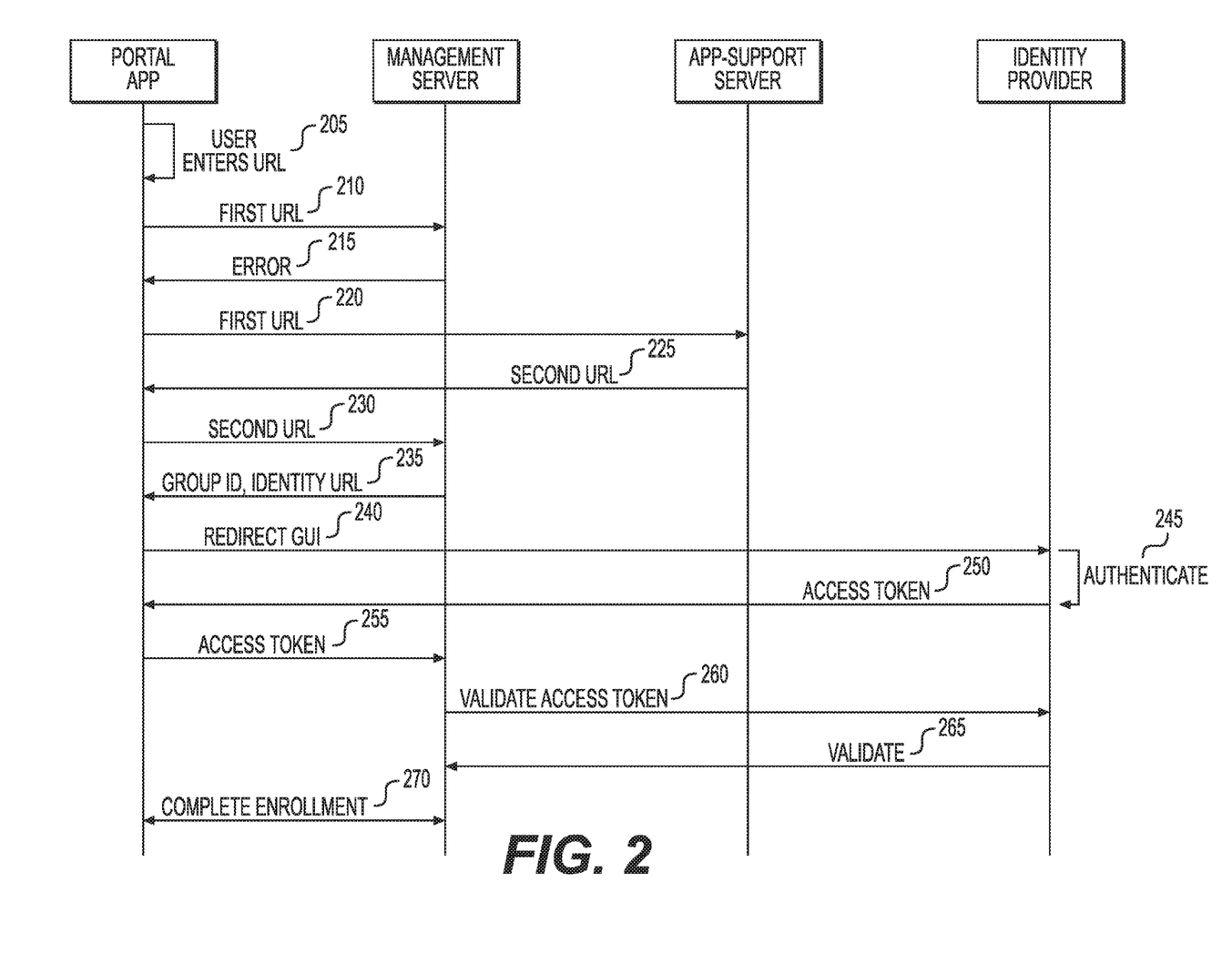
FIG. 2 is a sequence diagram of an example method for dynamically determining a server for enrolling a user device with a management system.

FIG. 2 provides a sequence diagram of an example method using at least some of the components described in the system of FIG. 1. At stage 205, the user can enter a piece of information through the portal application 150. The portal application 150 can prompt the user for that information upon first launch, in an example. Because the portal application 150 can require enrollment with the management server 120 in order to provide full functionality, it can prompt the user for information to be used for enrollment when first launched. The prompt can ask the user for an enrollment URL or, in some examples, an email address or a QR code.

In the example of FIG. 2, the user enters a URL. The URL can be provided to the user by an administrator, for example. At stage 210, the portal application 150 can receive the URL and attempt to use it to contact the management server 120 for the purpose of initiating enrollment. For example, the portal application 150 can modify the URL by adding an extension associated with the management server 120, or with an enrollment trigger at the management server 120. In FIG. 2, stage 210 shows a communication between the portal application 150 and the management server 120, but this visual indication is intended to convey the portal application's 150 attempt to contact the management server 120 (using the modified URL that contains an extension associated with the management server 120).

If the modified URL at stage 210 is the correct one for enrollment at the management server 120, then the method can skip to stage 235. If not, an error notification will be returned at stage 215. The error notification can be a "404" notification or simply a failure to connect to an endpoint. The modified URL can be incorrect because, for example, the URL provided by the user at stage 205 can be a URL associated with the application-support server 130. In that example, the modified URL will include that URL along with an extension that is associated with the management server 120. When the portal application 150 attempts to access the modified URL, the request will be directed to the application-support server 130, but the application-support server 130 will not recognize the modified URL because of the management-server-specific extension portion of the modified URL. In that example, the modified URL will be used to contact the application-support server 130, rather than the management server 120, at stage 210. Similarly, the error at stage 215 will be returned from the application-support server 130 rather than the management server 120. However, these stages are depicted in FIG. 2 as contact to and from and the management server 120, indicating that the portal application 150 is intending to contact the management server 120. It is understood, however, that the contact may only be between the portal application 150 and application-support server 130 during these two stages.

At stage 220, the portal application 150 can automatically modify the original URL to make it compatible with the application-support server 130. This stage can be performed in response to the error indication at stage 215. This stage can be performed automatically, without input from the user, management server 120, or application-support server 130 (beyond a possible error notification). The portal application 150 can therefore make a determination to modify the URL provided at stage 205 (the "first URL") to include an extension associated with the application-support server 130, resulting in a second modified first URL. The second modified first URL can then be used to contact a specific server location at the application-support server 130 at stage 220.

In an example where the application-support server 130 recognizes the URL at stage 220, the application-support server 130 can respond to the portal application 150 at stage 225. For example, the application-support server 130 can provide a second URL to be used at the management server 120 for enrollment purposes. In some examples, the application-support server 130 can provide additional information at this stage, such as a Group ID that identifies the customer, tenant, or enterprise to which the user belongs. The application-support server 130 can also provide authentication or identity information for the user. In some examples the management server 120 is used as the "source of truth" for enrollment purposes, so information provided by the application-support server 130 can be separately verified before use.

At stage 230, the portal application 150 can use the second URL to contact the management server 120 to request enrollment. If the second URL is valid, the management server 120 can return information to the portal application 150 at stage 235. The information can include instructions for continuing enrollment, for example. The information can include a Group ID that identifies the customer, tenant, or enterprise to which the user belongs. The information can also include an Identity URL, which can be a URL associated with the identity provider 140. The information can also include an instruction to redirect the user to an interface of the identity provider 140. In some examples, the portal application 150 can provide a Group ID at stage 230 corresponding to the Group ID provided by the application-support server 130 at stage 225. The management server 120 can use the Group ID to identify information about the user, such as an enterprise to which the user belongs. The management server 120 can also confirm that Group ID or send a new one back to the portal application 150 at stage 235.

At stage 240, the portal application 150 can display the redirect for the identity provider 140 in the GUI of the portal application 150. The GUI can include one or more fields for a user to input their authentication credentials, such as a username and password combination. The portal application 150 can receive that information and transmit it to the identity provider 140 at stage 240. The identity provider 140 can authenticate the information at stage 245. Authentication can include accessing a database with information corresponding to the user and confirming that the authentication credentials match the information in the database. If so, the identity provider 140 can return an access token to the portal application 150 at stage 250. The access token can be any type of token, certificate, cookie, or object that indicates the user was authenticated by the identity provider 140.

The portal application 150 can then provide the access token to the management server 120 at stage 255. The management server 120 can then request validation of the access token from the identity provider 140 at stage 260. Requesting validation can include requesting confirmation that the access token was, in fact, generated or provided by the identity provider 140. If the access token provided for validation at stage 260 is the same one sent to the portal application 150 at stage 250, the identity provider 140 can validate the access token at stage 265 and send a communication indicating that the access token is validated.

The management server 120 can then continue enrollment processes at stage 270, which can include generating an authentication token at the management server 120. The authentication token can be sent to the portal application 150 for use when communicating with the management server 120. For example, when the portal application 150 sends a secure communication, such as a request for access to enterprise resources, to the management server 120 or elsewhere within the management system, it can include the authentication token with that communication. The relevant management system component can authenticate the authentication token and allow access to the enterprise resources based on that authentication.

Figure 3:
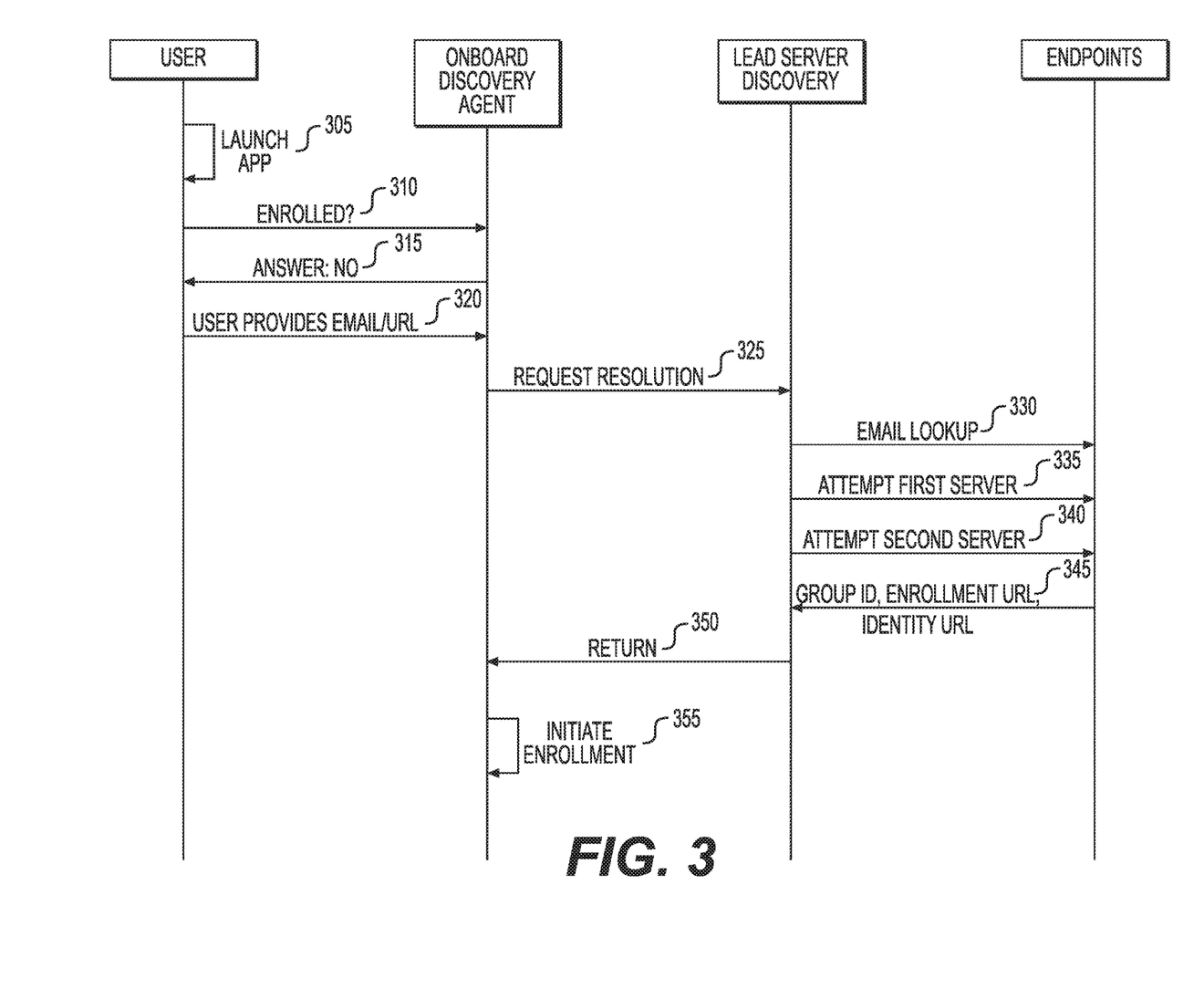
FIG. 3 is a sequence diagram of an example method for dynamically determining a server for enrolling a user device with a management system.

FIG. 3 provides a sequence diagram of an example method, showing more detail with respect to the operation of the portal application 150 itself. At stage 305 of the method, the user can launch the portal application 150 on the user device 110. In some examples, this stage can also include downloading the portal application 150 from an application store or receiving the portal application 150 from an application provisioning server. When the portal application 150 is launched, an onboard discovery agent 152 can be initiated.

At stage 310, the onboard discovery agent 152 can determine whether the user or user device 110 is enrolled with the management system. For example, the onboard discovery agent 152 can access a storage location at the user device 110 to determine whether an authorization token has been issued by the management server 120 and stored at the user device 110. The authorization token can be stored in a storage location dedicated to the portal application 150 in one example. In some examples, the portal application 150 can set a flag indicating that enrollment has been completed.

If the onboard discovery agent 152 does not find a relevant authorization token, flag, or other indication of enrollment, then at stage 315 it can determine that the user or user device 110 is not enrolled. Based on this determination, stage 315 can include prompting the user to enter information to begin enrollment. The prompt can be displayed on a GUI page of the portal application 150 and can request various types of information, such as an email address, URL, or QR code. The example of FIG. 3 encompasses all three of these options.

At stage 320, the user can provide an email, URL, or QR code. The email or URL can be typed into a text interface, while the QR code can be captured by a camera of the user device 110. For example, the GUI of the portal application 150 can include a button for QR code that, when selected, opens a camera application and allows a user to scan the QR code. The onboard discovery agent 152 can receive the information provided at stage 320 and request further resolution from the lead server discovery module 154 at stage 325.

Generally speaking, the lead server discovery module 154 can take various steps to further the enrollment process based on the information provided by the user. The lead server discovery module 154 can act dynamically, adjusting to the types of information fed to it from the user and from other sources. In the example of a QR code, the lead server discovery module 154 can perform a lookup at stage 330. For example, the lead server discovery module 154 can parse a table that includes QR codes and associated email addresses. The user's email address can then be extracted and used as if the user had entered that email address.

The email lookup at stage 330 can also include using the email address (whether provided directly by the user or obtained from the QR code) to obtain additional information from an endpoint. In one example, the endpoint is a server or database storing identity information correlated to email addresses. An example of such a database is Active Directory®. Another example is the identity provider 140 of FIG. 1. In those examples, stage 330 can include making an API call to the directory from the portal application 150 and receiving user information in return.

In examples where the user provides a URL (or the QR code is linked to a URL rather than an email address), the email lookup portion of stage 330 can be skipped. Instead, the lead server discovery module 154 can attempt to contact a first server at stage 335. For example, the lead server discovery module 154 can attempt to contact the management server 120 using a modified version of the URL provided by the user at stage 320. The lead server discovery module 154 can modify the URL by adding an extension associated with the management server 120 or with an enrollment trigger at the management server 120. In some examples, enrollment is triggered by accessing a specific extension at the management server 120.

As explained with respect to FIG. 2, if the URL provided by the user points toward the application-support server 130 rather than the management server 120, the modified URL will contact the application-support server 130 instead of the management server 120 as intended. But because the modified URL includes an extension that is associated with the management server 120, the application-support server 130 may not respond or otherwise recognize the modified URL. This can result in an error message or simply a lack of response.

After receiving the error message or after a threshold period of time elapses without receiving a response, the lead server discovery module 154 can attempt to contact a second server at stage 340. For example, the lead server discovery module 154 can modify the original URL provided by the user at stage 320 to include an extension that is associated with the application-support server 130. The URL modified with the application-support-server extension can then be used to contact the application-support server 130 at stage 340.

The application-support server 130 can respond to this contact at stage 345 by providing a variety of information. In some examples, the application-support server 130 simply provides a second URL, referred to in FIG. 3 as the "enrollment URL," that can be used to contact the management server 120 and initiate enrollment. The communication at stage 345 can also include a Group ID that identifies the customer, tenant, or enterprise to which the user belongs. In some examples, the communication can also include an identity URL. The identity URL can be used to contact the identity provider 140 in order to authenticate the user. This can be done as part of a GUI redirect within the portal application 150, for example.

At stage 350, the lead server discovery module 154 can return the information received at stage 345 to the onboard discovery agent 152. The onboard discovery agent 152 can then initiate enrollment at stage 355 by contacting the management server 120 using the enrollment URL. The management server 120 can then provide instructions for continuing enrollment, such as by confirming or updating the Group ID and identity URL and directing the portal application 150 to redirect a GUI to the identity provider 140 so the user can authenticate. The stages of FIG. 3 that do not require user input can be performed in the background such that they are invisible to the user. In this manner, the portal application 150 can dynamically determine the correct server for enrollment and retrieve any necessary information for initiating and continuing the enrollment process.

Figure 4A:
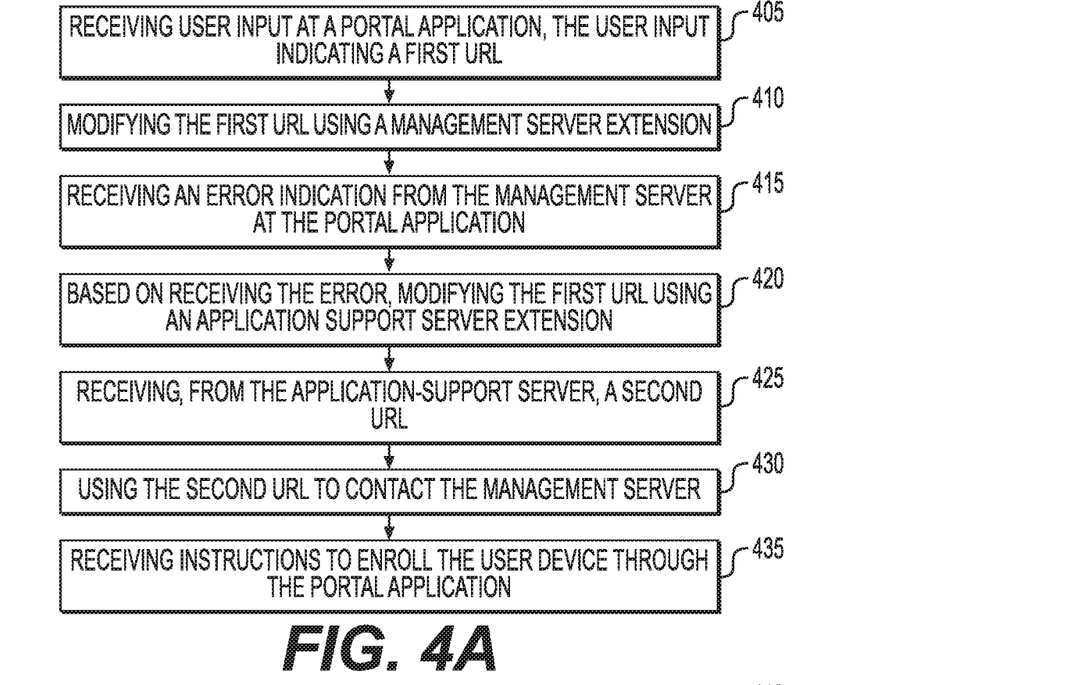
FIG. 4A is a flowchart of an example method for dynamically determining a server for enrolling a user device with a management system.

FIG. 4A provides a flowchart of an example method for dynamically determining a server for enrolling a user device 110 with a management system. Stage 405 can include receiving user input at a portal application 150. The user input can indicate a first URL, such as a URL provided to the user by an administrator. The user input can indicate a URL based on a QR code in some examples, where the portal application 150 looks up the URL based on receiving the QR code.

At stage 410, the portal application 150 modifies the first URL using a management server 120 extension. For example, the portal application 150 can add an extension to the first URL. The extension can be associated with a server location at the management server 120 that corresponds to enrollment, such as an enrollment trigger. The portal application 150 can then follow the modified first URL to an endpoint. In this example, the portal application 150 is attempting to access the management server 120, but the first URL points to an application-support server 130 rather than the management server 120. As a result, the management-server-based extension added to the URL can produce an error or lack of response when it attempts to direct to the application-support server 130.

As a result, stage 415 can include receiving an error indication. Although the error indication is described in FIG. 4A as being received from the management server 120, in practice the error indication can be received from the application-support server 130. However, from the perspective of the portal application 150, which is attempting to contact the management server 120, the error indication may be viewed or interpreted as coming from the management server 120. The language used in the drawings are not intended to be limiting on this point. The error indication can also include a simple lack of response from a server in some examples.

Based on receiving the error indication or lack of a response, at stage 420 the portal application 150 can modify the first URL using an application-support server 130 extension rather than the management server 120 extension used at stage 410. This stage can be performed automatically, without input from the user, management server 120, or application-support server 130 (beyond a possible error notification). This version of the first URL can be considered the second modified first URL. The second modified first URL can then be used by the portal application 150 to contact a specific server location at the application-support server 130 as part of stage 420.

At stage 425, the application-support server 130 can respond to the portal application 150 with a second URL. The second URL can be an enrollment URL that triggers or requests enrollment at the management server 120. In some examples, the application-support server 130 can provide additional information at this stage, such as a Group ID that identifies the customer, tenant, or enterprise to which the user belongs. The application-support server 130 can also provide authentication or identity information for the user.

At stage 430, the portal application 150 can use the second URL to contact the management server 120, for example by making a call or otherwise contacting the management server 120 at the location specified by the second URL. In response, the management server 120 can provide instructions at stage 435 for enrolling the user device 110 through the portal application 150.

Figure 4B:
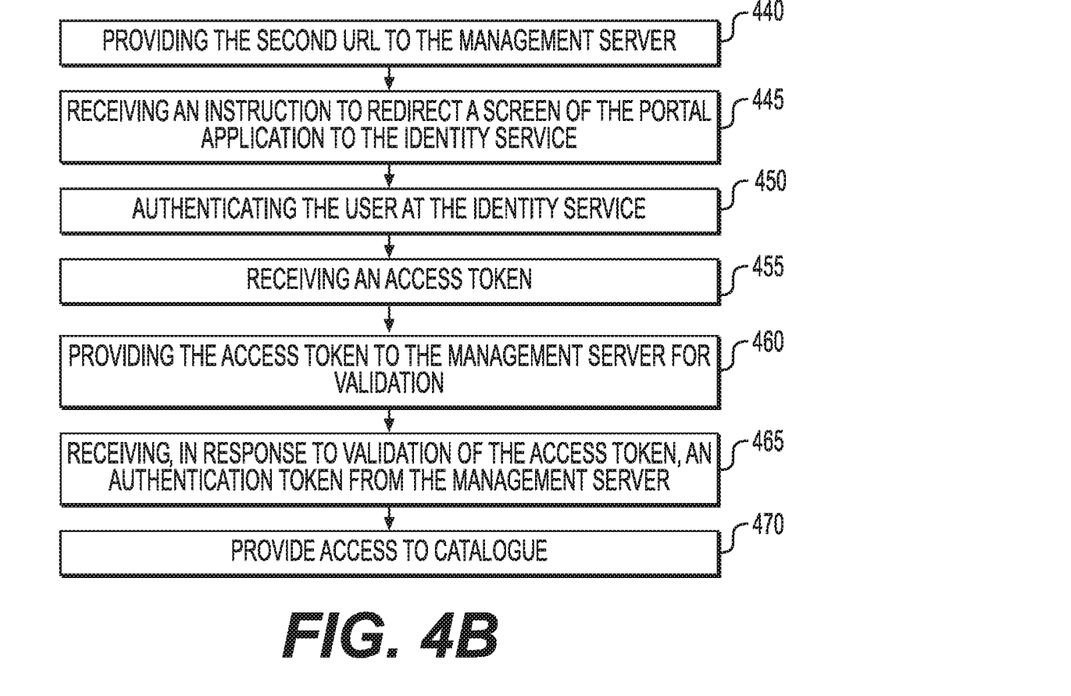
FIG. 4B is a flowchart of an example method for dynamically determining a server for enrolling a user device with a management system.

This example is picked up in FIG. 4B, which provides a flowchart of additional actions that can be taken by the portal application 150. Stage 440 can include providing the second URL to the management server 120, as discussed above with respect to stage 430 of FIG. 4A. For example, the portal application 150 can use the second URL to contact the management server 120 at a location specific to enrollment requests.

At stage 445, the portal application 150 can receive an instruction to redirect a screen of the portal application 150 to the identity provider 140. This instruction can be provided as part of stage 435 in FIG. 4A, for example. The instruction can also include an identity URL, which can be a server location at the identity provider 140 corresponding to an authentication procedure for the user. The portal application 150 can display the relevant GUI page within the portal application 150, such as a GUI page that displays elements retrieved from the identity URL. These elements can include, for example, username and password fields. Other forms of authentication can be used, such as tokens or certificates. This authentication process can be performed as part of stage 450.

When the identity provider 140 authenticates the user, it can send a communication to the portal application 150 at stage 450 indicating that the user, user device 110, or both, are authenticated. This communication can include an access token from the identity provider 140 at stage 455. The access token can indicate that the user has been authenticated by the identity provider 140. At stage 460, the portal application 150 can provide the access token to the management server 120 as part of the enrollment process. The management server 120 can then validate the access token by contacting the identity provider 140 and requesting validation as part of stage 460. The identity provider 140 can then confirm that the access token was provided by the identity provider 140 for the user, user device 110, or both.

In response to validation of the access token, the management server 120 can issue an authentication token to the portal application 150 at stage 465. The authentication token can be generated by the management server 120 and sent to the portal application 150 for use when communicating with the management server 120. For example, when the portal application 150 sends a secure communication, such as a request for access to enterprise resources, to the management server 120 or elsewhere within the management system, the portal application 150 can include the authentication token with that communication. The relevant management system component can authenticate the authentication token and allow access to the enterprise resources based on that authentication.

At stage 470, the portal application 150 can provide the user with access to the catalogue 156. This can include, for example, populating the catalogue 156 with application icons corresponding to applications for which the user is authorized to access. The portal application 150 can obtain the list of authorized application from the management server 120 or application-support server 130, or both. The portal application 150 can retrieve that list by making an API call to the relevant server, in an example. The portal application 150 can also periodically refresh the listing of icons in the catalogue 156, such as by refreshing upon launch of the portal application 150 or after a predetermined period of time has elapsed from the last refresh.

In the examples above, references are made to a Group ID that can be used for enrollment. In some examples, a Group ID can refer to a root organizational group, which can be understood as the highest-level organizational group for that user. As an example, Company X can be a customer of an EMM service. Company X may have, for example, 10,000 employees that it wishes to enroll in the EMM service. But Company X can also define lower-level organizational groups that break down the overall group of employees along various lines. In one example, Company X can have separate organizational groups corresponding to the geographic location of the user (for example, one group for the employees in the Texas office, a second group for employees in the California office, and a third group for employees in the Georgia office).

In another example, Company X can have separate organizational groups corresponding to departments in which the employees are location, such as different organizational groups for employees in the accounting department, sales department, and legal department. These different organizational groups can be combined or cross referenced, such as by identifying all Texas employees in the sales department. An administrator can choose to apply policies and compliance rules to user devices 110 based on one or more organizational groups. These policies and compliance rules can be transmitted to a user device 110 in the form of one or more profiles provisioned from the management server 120.

As a result, during the enrollment process the management server 120 can attempt to determine one or more organizational groups that apply to the user requesting enrollment. Based on the user's email address or the Group ID received from the application-support server 130 or stored at the management server 120, the root organizational group can be determined. In order to determine more specific, lower-level organization groups, the management server 120 can access a database or repository that stores instructions from an administrator regarding funneling users into particular organizational groups.

For example, during the enrollment process the management server 120 can retrieve a table from a database that includes rules for determining lower-level organization groups. In one example, the rules correspond to a serial number of the user device 110. An administrator can pre-register specific user devices 110 by entering the serial numbers of those devices into a console that communicates with the management server 120. When the management server 120 cross references the serial number of the enrolling user device 110 with the table, it can fetch a lower-level organizational group for the user device 110. Settings and policies for the device can then be established based on that group.

In another example, the management server 120 can retrieve a table that correlates users with user groups, such as an accounting group or sales group. The user group can then be used to determine settings and policies to apply to the user device 110. In some examples, the user can be prompted for information regarding their user group. For example, the GUI of the portal application 150 can prompt the user to select between various user groups such as the accounting group or sales group. The portal application 150 can populate the options based on the geographic location of the user device 110, the user's email address, or information such as tables stored at the management server 120.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamically enrolling a user device with a management system, comprising:
   receiving an enrollment request from a user device;
   determining that the enrollment request includes at least one of a uniform resource locator ("URL") and a scanned code corresponding to the URL;
   attempting to contact a first server using the URL provided by the enrollment request;
   receiving an error indication;
   automatically modifying the URL to form a modified URL;
   contacting at least one of the first server and a second server using the modified URL;
   receiving a new URL from the contacted server;
   providing the new URL to the user device; and
   instructing the user device to use the new URL to perform enrollment with an enrollment server.

2. The method of claim 1, wherein automatically modifying the URL comprises adding an extension to the URL, the extension being associated with at least one of the first server and the second server.

3. The method of claim 1, wherein attempting to contact the first server using the URL comprises adding an extension associated with the first server to the URL prior to attempting to contact the first server.

4. The method of claim 1, further comprising:
   receiving an identity URL from the contacted server; and
   instructing the user device to use the identity URL to authenticate with an identity service.

5. The method of claim 4, wherein instructing the user device comprises causing the user device to display a screen associated with the identity service.

6. The method of claim 4, further comprising:
   receiving an access token from the user device indicating that the user device has authenticated with the identity service; and
   validating the access token with the identity service.

7. The method of claim 6, further comprising providing an authentication token to the user device, the authentication token authorizing a portal application on the user device to provide access to one or more additional applications through a user interface of the portal application.

8. A non-transitory, computer-readable medium containing instructions that, when executed by a hardware-based processor, perform stages for dynamically enrolling a user device with a management system, the stages comprising:
   receiving an enrollment request from a user device;

determining that the enrollment request includes at least one of a uniform resource locator ("URL") and a scanned code corresponding to the URL;
attempting to contact a first server using the URL provided by the enrollment request;
receiving an error indication;
automatically modifying the URL to form a modified URL;
contacting at least one of the first server and a second server using the modified URL;
receiving a new URL from the contacted server;
providing the new URL to the user device; and
instructing the user device to use the new URL to perform enrollment with an enrollment server.

9. The non-transitory, computer-readable medium of claim 8, wherein automatically modifying the URL comprises adding an extension to the URL, the extension being associated with at least one of the first server and the second server.

10. The non-transitory, computer-readable medium of claim 8, wherein attempting to contact the first server using the URL comprises adding an extension associated with the first server to the URL prior to attempting to contact the first server.

11. The non-transitory, computer-readable medium of claim 8, the stages further comprising:
receiving an identity URL from the contacted server; and
instructing the user device to use the identity URL to authenticate with an identity service.

12. The non-transitory, computer-readable medium of claim 11, wherein instructing the user device comprises causing the user device to display a screen associated with the identity service.

13. The non-transitory, computer-readable medium of claim 11, the stages further comprising:
receiving an access token from the user device indicating that the user device has authenticated with the identity service; and
validating the access token with the identity service.

14. The non-transitory, computer-readable medium of claim 13, the stages further comprising providing an authentication token to the user device, the authentication token authorizing a portal application on the user device to provide access to one or more additional applications through a user interface of the portal application.

15. A system for dynamically enrolling a user device with a management system, comprising:
a memory storage including a non-transitory, computer-readable medium comprising instructions; and
a computing device including a hardware-based processor that executes the instructions to carry out stages comprising:
receiving an enrollment request from a user device;
determining that the enrollment request includes at least one of a uniform resource locator ("URL") and a scanned code corresponding to the URL;
attempting to contact a first server using the URL provided by the enrollment request;
receiving an error indication;
automatically modifying the URL to form a modified URL;
contacting at least one of the first server and a second server using the modified URL;
receiving a new URL from the contacted server;
providing the new URL to the user device; and
instructing the user device to use the new URL to perform enrollment with an enrollment server.

16. The system of claim 15, wherein automatically modifying the URL comprises adding an extension to the URL, the extension being associated with at least one of the first server and the second server.

17. The system of claim 15, wherein attempting to contact the first server using the URL comprises adding an extension associated with the first server to the URL prior to attempting to contact the first server.

18. The system of claim 15, the stages further comprising:
receiving an identity URL from the contacted server; and
instructing the user device to use the identity URL to authenticate with an identity service.

19. The system of claim 18, wherein instructing the user device comprises causing the user device to display a screen associated with the identity service.

20. The system of claim 18, the stages further comprising:
receiving an access token from the user device indicating that the user device has authenticated with the identity service; and
validating the access token with the identity service.

* * * * *